(12) United States Patent
Emberling et al.

(10) Patent No.: US 6,778,188 B2
(45) Date of Patent: Aug. 17, 2004

(54) RECONFIGURABLE HARDWARE FILTER FOR TEXTURE MAPPING AND IMAGE PROCESSING

(75) Inventors: Brian D. Emberling, San Mateo, CA (US); Michael G. Lavelle, Saratoga, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 105 days.

(21) Appl. No.: 10/085,634

(22) Filed: Feb. 28, 2002

(65) Prior Publication Data

US 2003/0160799 A1 Aug. 28, 2003

(51) Int. Cl.[7] .................................................. G09G 5/00
(52) U.S. Cl. .................... 345/606; 345/853; 345/854; 345/606; 345/610; 345/472
(58) Field of Search ................................. 345/582, 643, 345/853, 854, 606, 610, 472

(56) References Cited

U.S. PATENT DOCUMENTS 5,353,059 A * 10/1994 Lawlor et al. ............... 348/398
5,487,023 A * 1/1996 Seckora ....................... 708/316

OTHER PUBLICATIONS

Savchenko, Sergei, "3D Graphics Programming," 2000, pp. 124–128 and 312–316.
Angel, Edward, "Interactive Computer Graphics," 2000, pp. 404–407.
Advanced Image Processing Webpage, Mar. 8, 2000, pp. 1–21.

* cited by examiner

*Primary Examiner*—Matthew C. Bella
*Assistant Examiner*—Tam Tran
(74) *Attorney, Agent, or Firm*—Meyertons Hood Kivlin Kowert & Goetzel, P.C.; Jeffrey C. Hood; Mark K. Brightwell

(57) ABSTRACT

A programmable filter comprising a tree of computational units, where each computational unit is configured to receive multiple inputs and generate multiple outputs, where the tree receives a set of input operands and generates output operands, where, in a sum of products mode, the output operands of the tree comprise a sum of products of the input operands by corresponding N-bit coefficients, where N is a positive integer, where, in a linear interpolation mode, each of the output operands of the tree comprise linear interpolations of at least two of the input operands, wherein coefficients of the linear interpolations have (N/2) bits of precision.

21 Claims, 13 Drawing Sheets

RECONFIGURABLE HARDWARE FILTER FOR TEXTURE MAPPING AND IMAGE PROCESSING

BACKGROUND OF THE INVENTION

1. Field of the Invention

This invention relates generally to the field of computer graphics and, more particularly, to systems configured for texture filtering and image processing operations.

2. Description of the Related Art

Texture filtering operations (such as bilinear and trilinear filtering) and image filtering operations (such as convolution and bicubic filtering) may be used in many graphics applications. Chip area on graphics processing devices is a very valuable commodity. Thus, a significant need exists for a mechanism of efficiently packing texture filtering and image processing operations into a limited chip area.

SUMMARY OF THE INVENTION

In one set of embodiments, a filter may be configured to perform arithmetic at different levels of precision, and to perform different functions depending on a current mode of operation. The filter may simultaneously process K operands (e.g. pixel components or texel components), where K varies depending on the complexity of the filtering operation to be performed in the current mode. Simpler filtering operations may allow larger values of K.

The filter may be configured (in a linear interpolation mode) to interpolate $M_p$ pixels (e.g. the four pixel components R, G, B and α for $M_p$ pixels) at N bits of precision per pixel component with an (N/2)-bit interpolation coefficient, where $M_p$ is a positive integer. Each output pixel component may be computed from two corresponding input pixel components according to the relation:

$$out = in1 * F + in2 * (1-F),$$

where F is the (N/2)-bit interpolation coefficient.

For more complex filtering, the filter may be configured to perform double precision blending, where the blending fraction is N bits. This may be accomplished by merging two basic computational subunits together and combining their results. In this way, it is possible to perform double-precision arithmetic on half as many operands as in the linear interpolation mode. This double precision blending mode may be used for convolution and bicubic filtering where the filter coefficients are N-bit quantities, versus N/2 bits for normal teture mapping.

The filter may include a set of computation units organized as a tree structure. In one embodiment, the filter may be dynamically configured to process:

two pixels at once for bilinear filtering, one pixel per cycle for trilinear filtering, or multiple cycles per pixel for convolution or bicubic filtering.

The filter tree may automatically act in a multi-cycle mode where partial results are accumulated for convolution and bicubic filtering.

In this way, a single filter tree may perform texture processing and image processing functions, at varying precision levels, and with its resources utilized optimally or near optimally.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
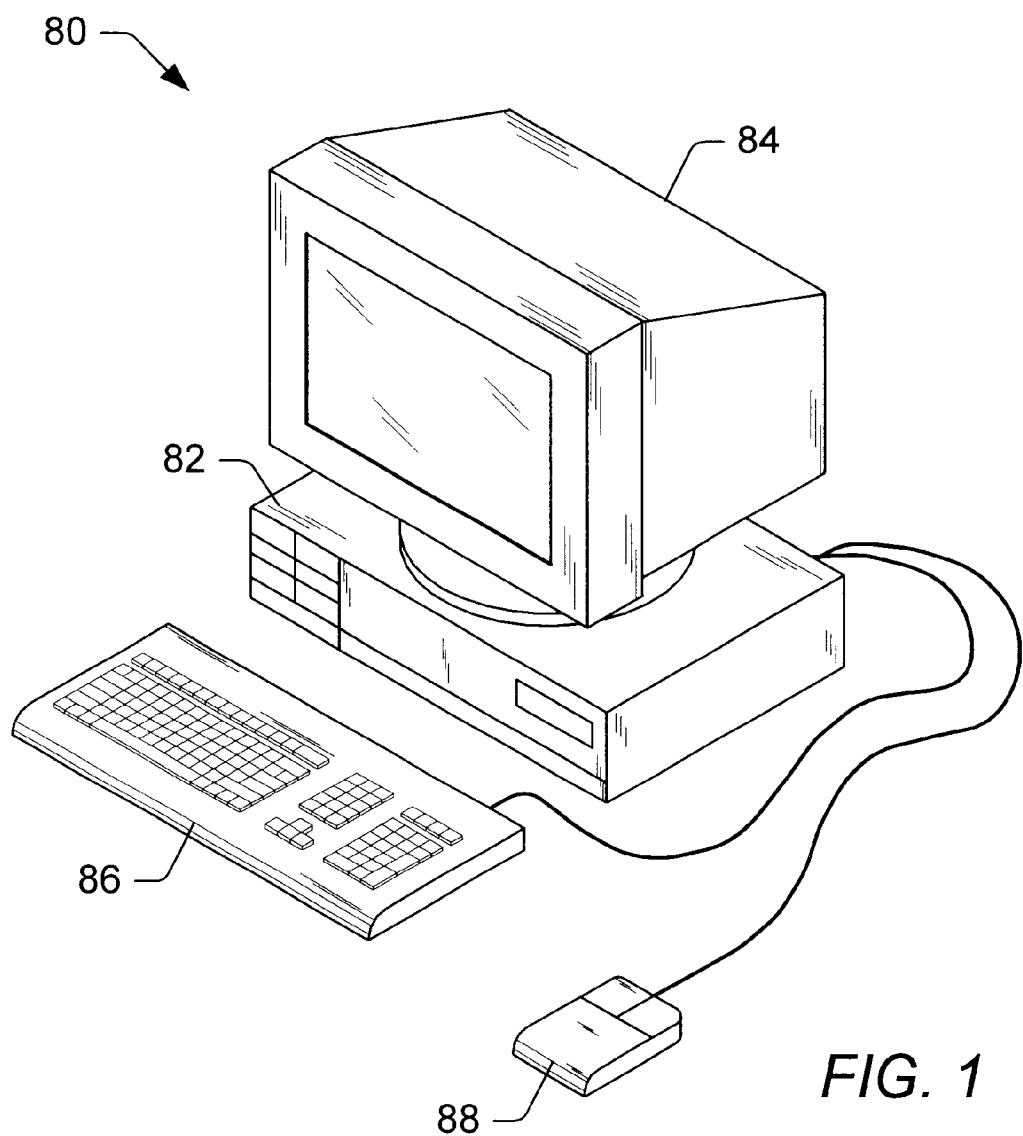
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
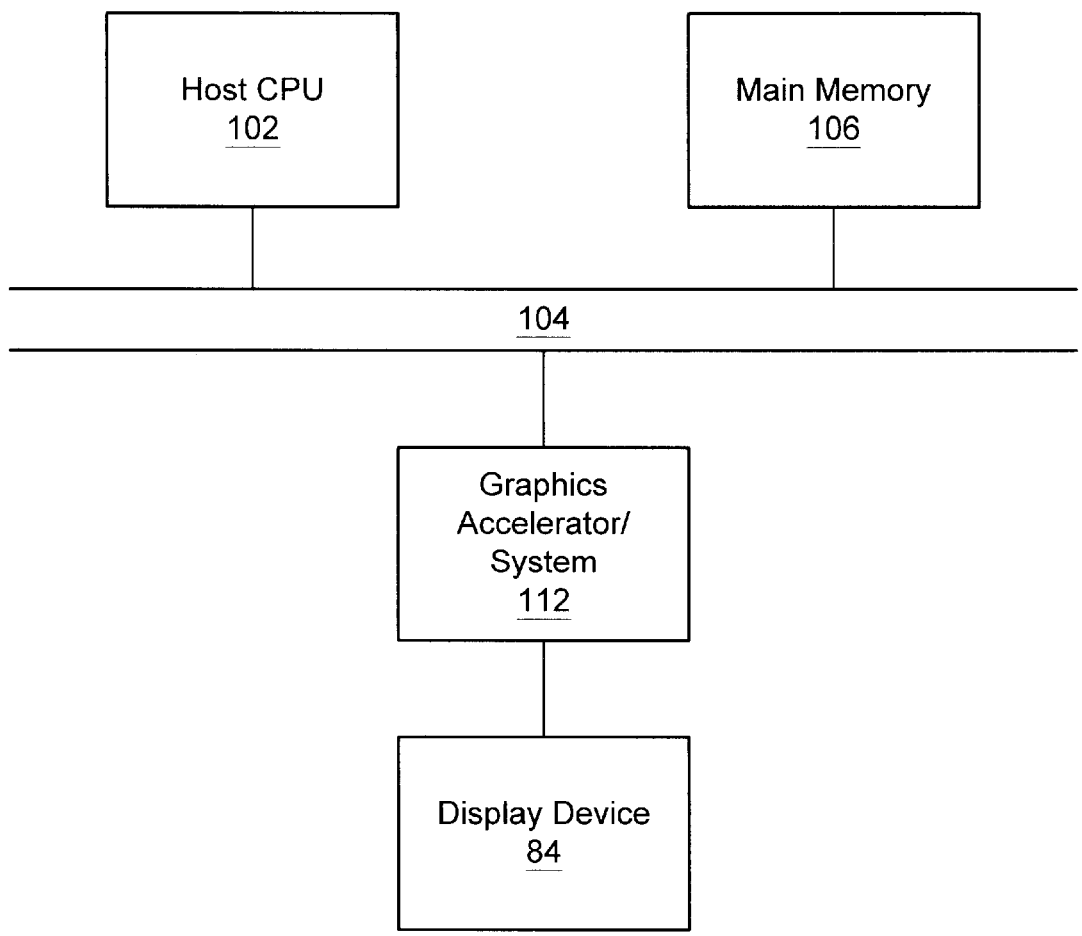
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
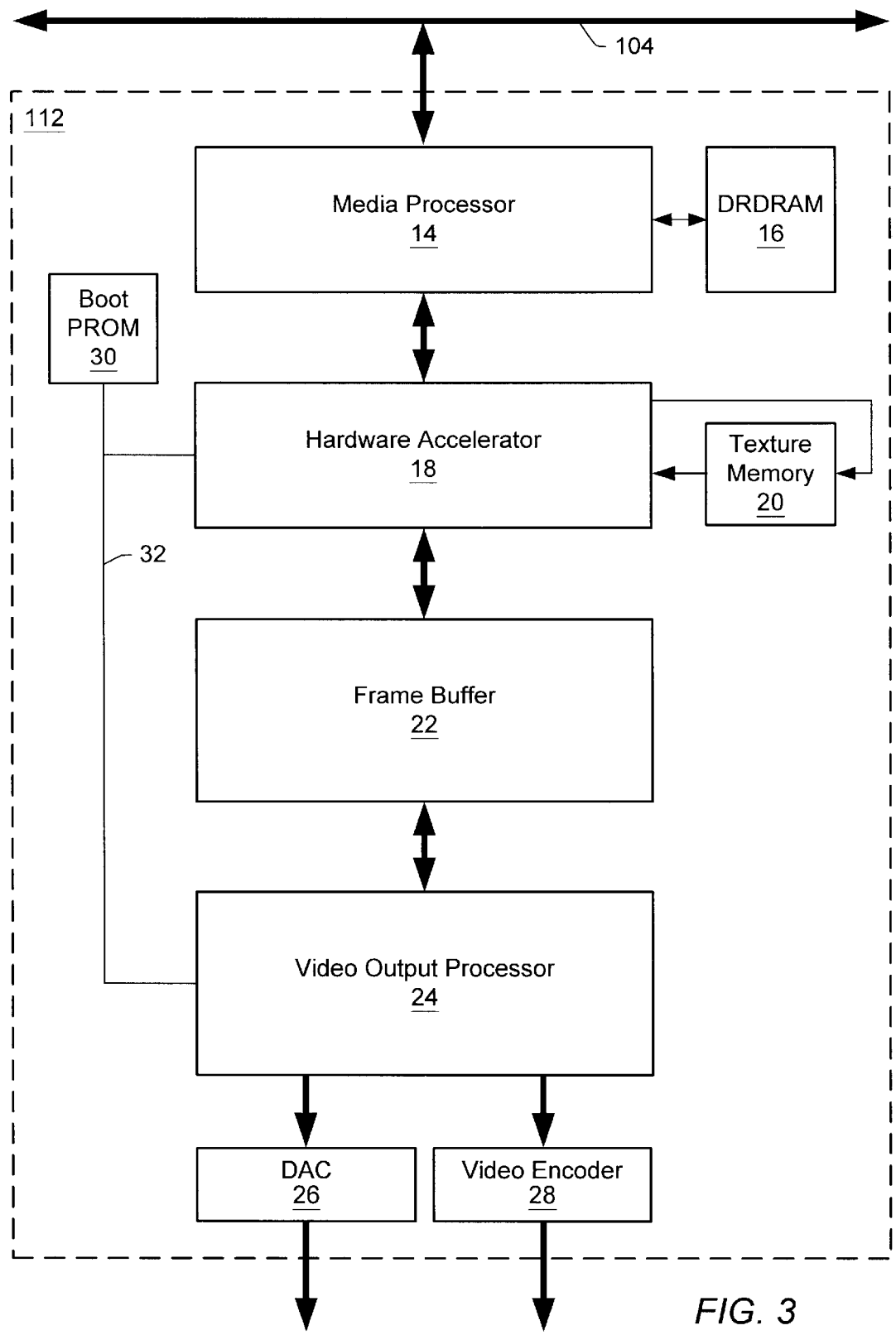
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
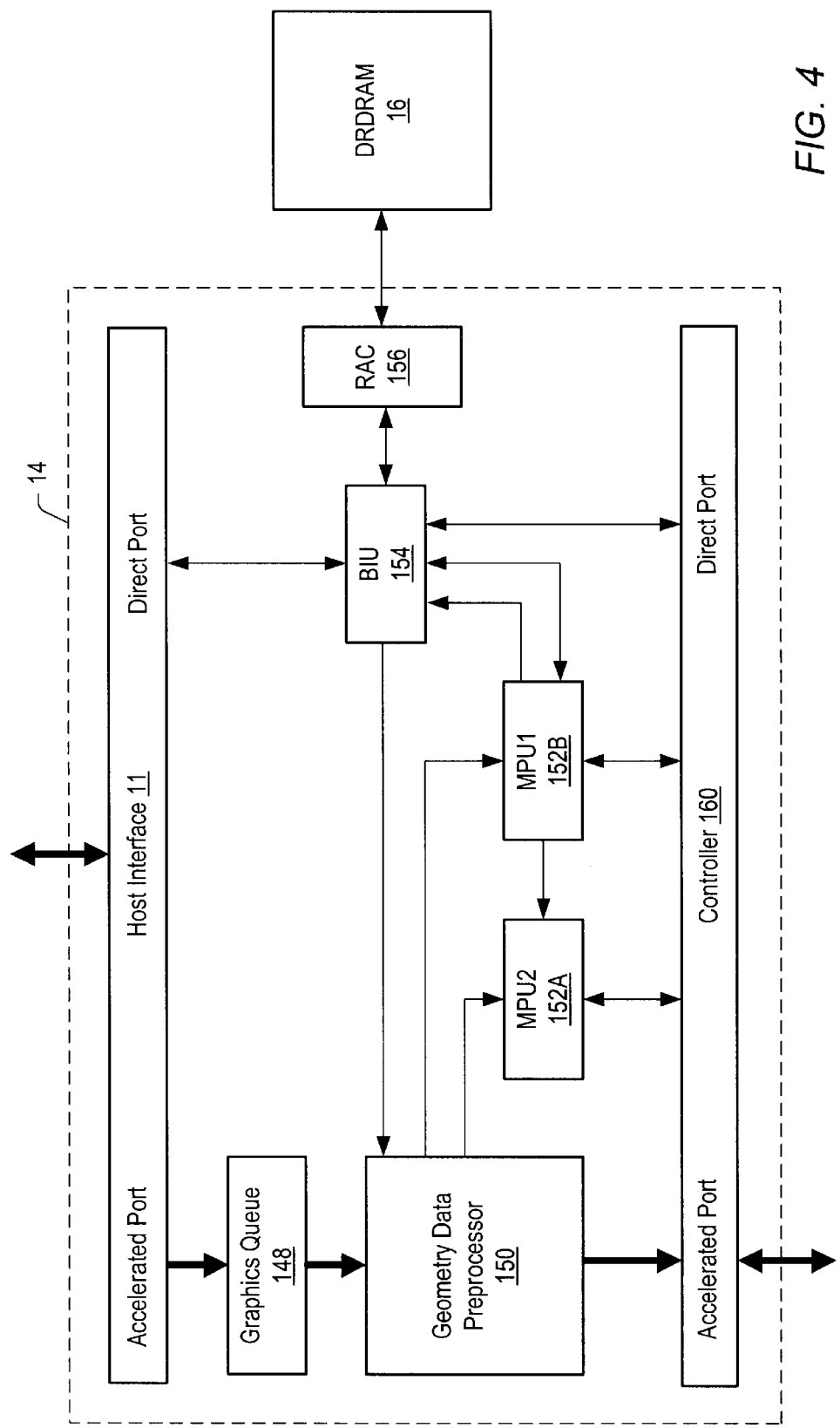
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mapping a (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
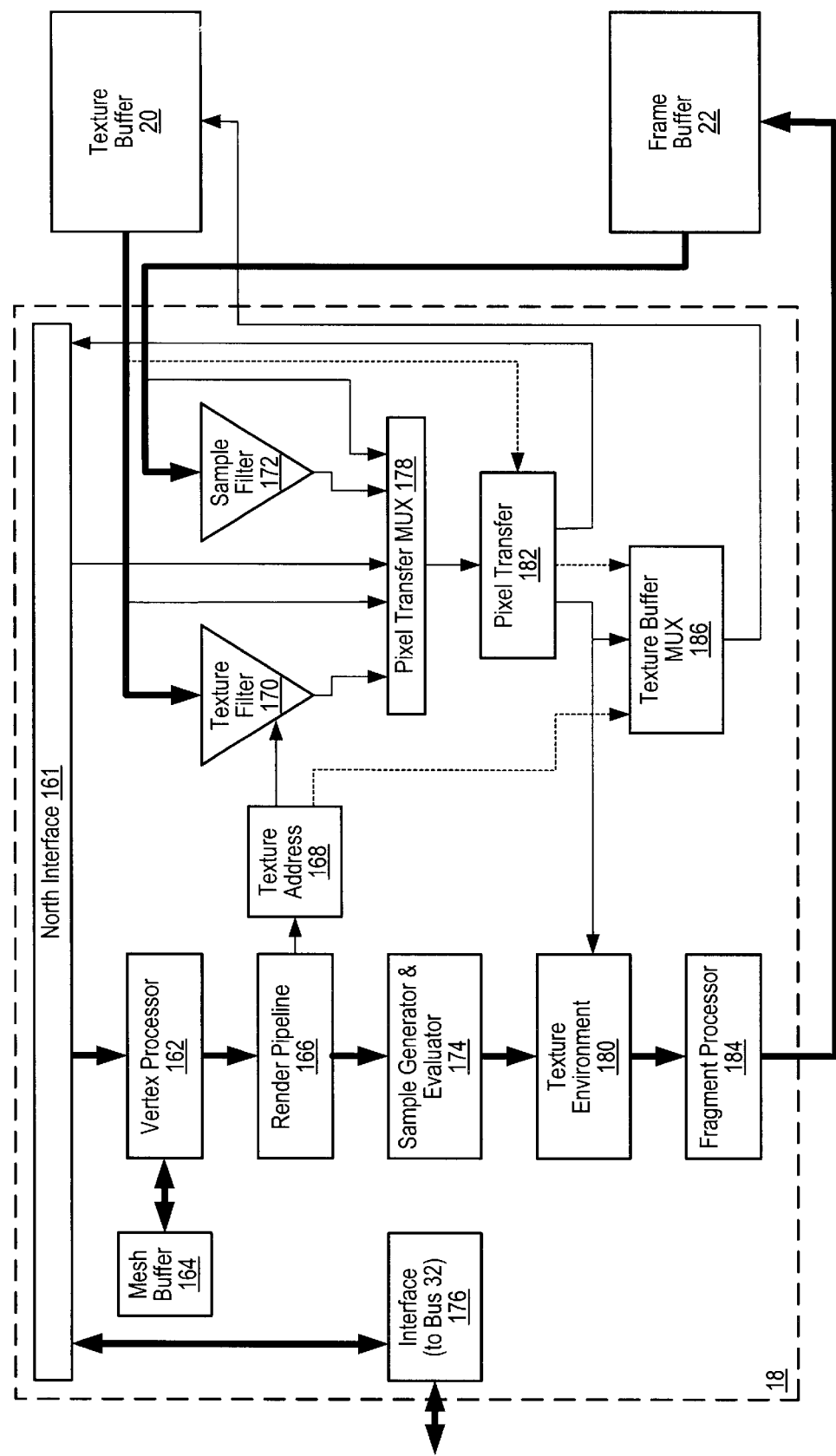
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle fall-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and sample buffer.

Figure 6:
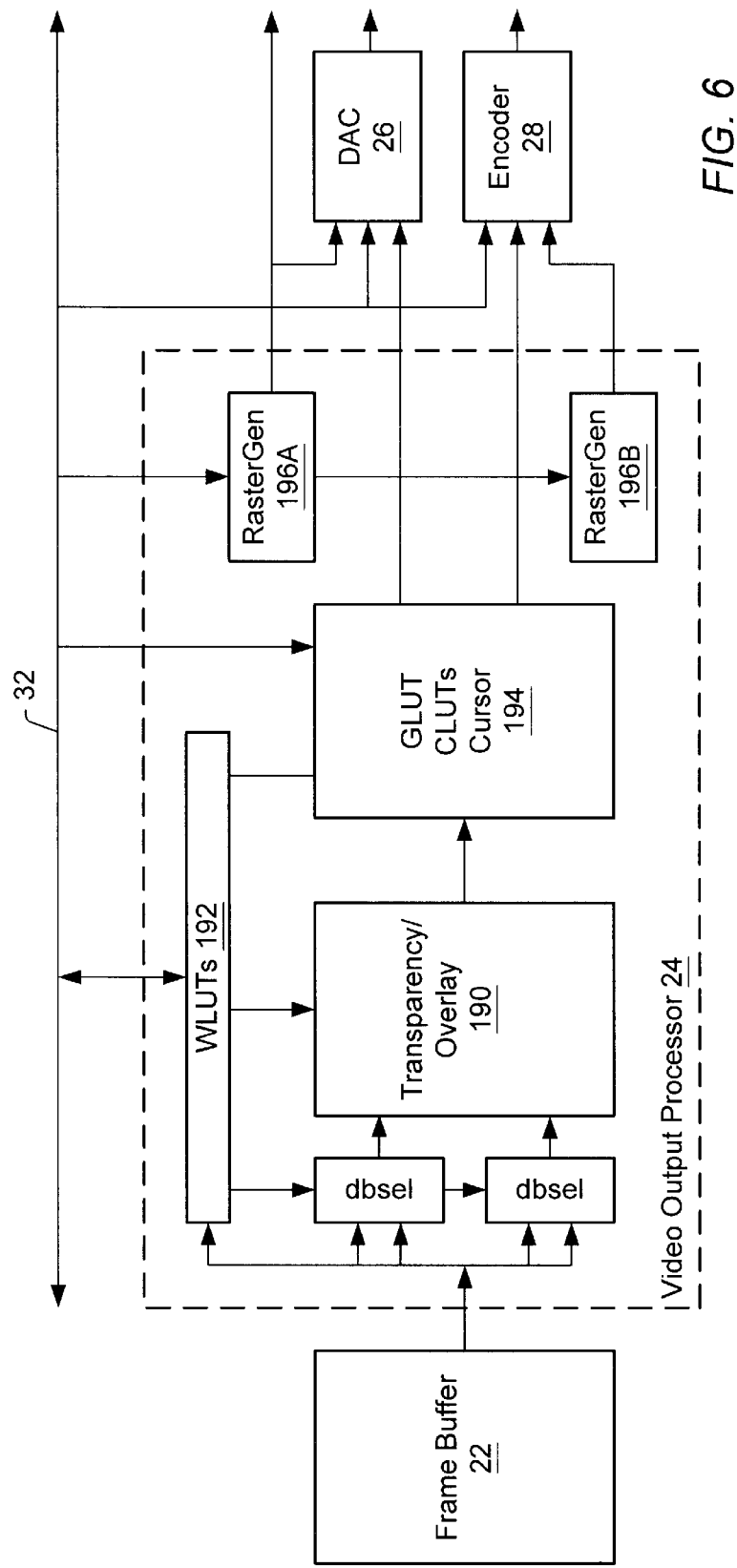
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
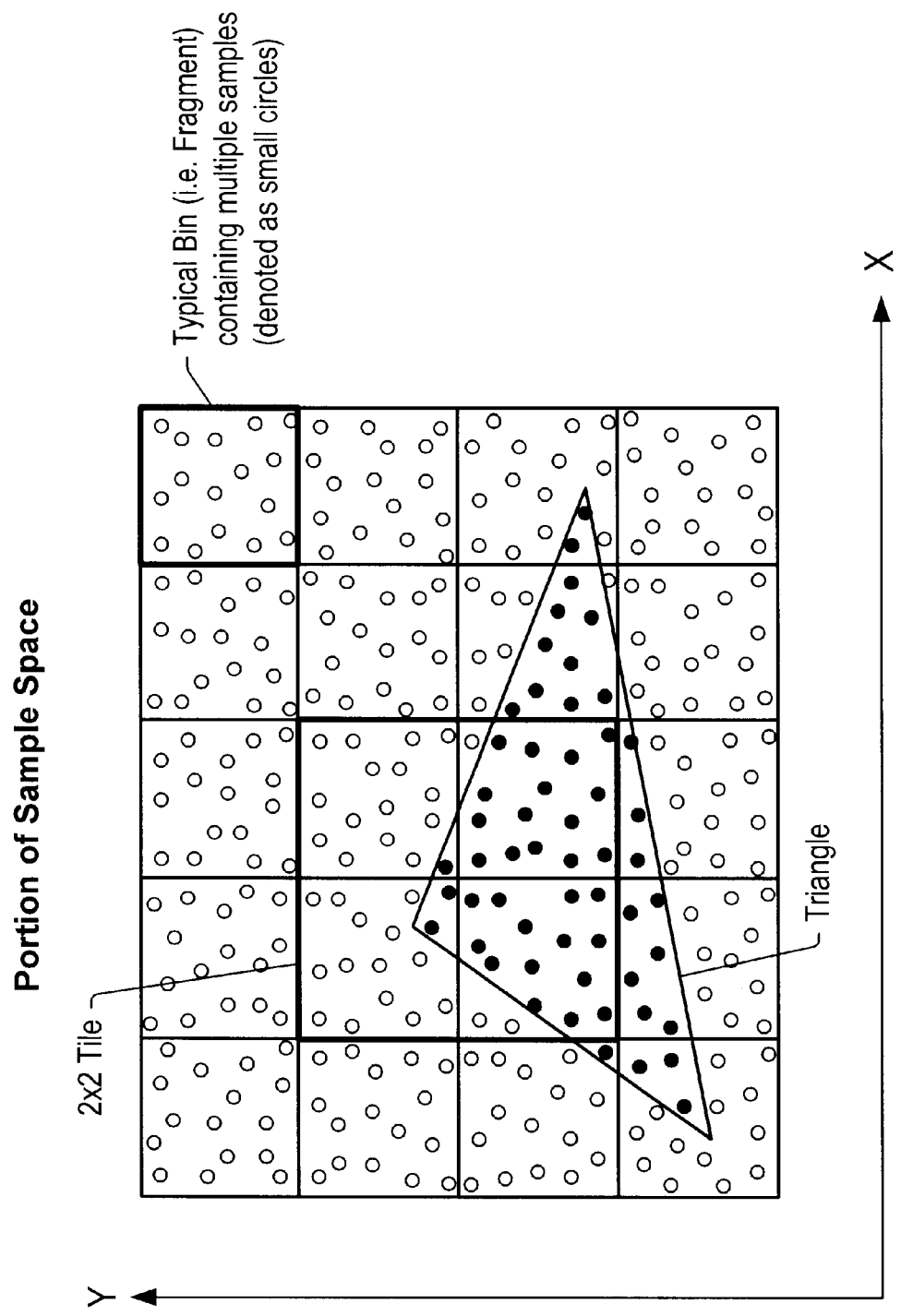
FIG. 7 illustrates a two-dimension field of sample positions in a sample space and a primitive superimposed on the sample space.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g. bin 300) as illustrated in FIG. 7. Each bin may contain one or more samples. The number of samples per bin may be a programmable parameter.

Reconfigurable Filter

In one set of embodiments, texture filter 170 may be dynamically configured to perform any operation in a set of imaging and texturing operations. Imaging operations include operations such as convolution and bicubic filtering. Texturing operations include operations such as bilinear, trilinear, quadlinear filtering of texels from a texture map.

Figure 8:
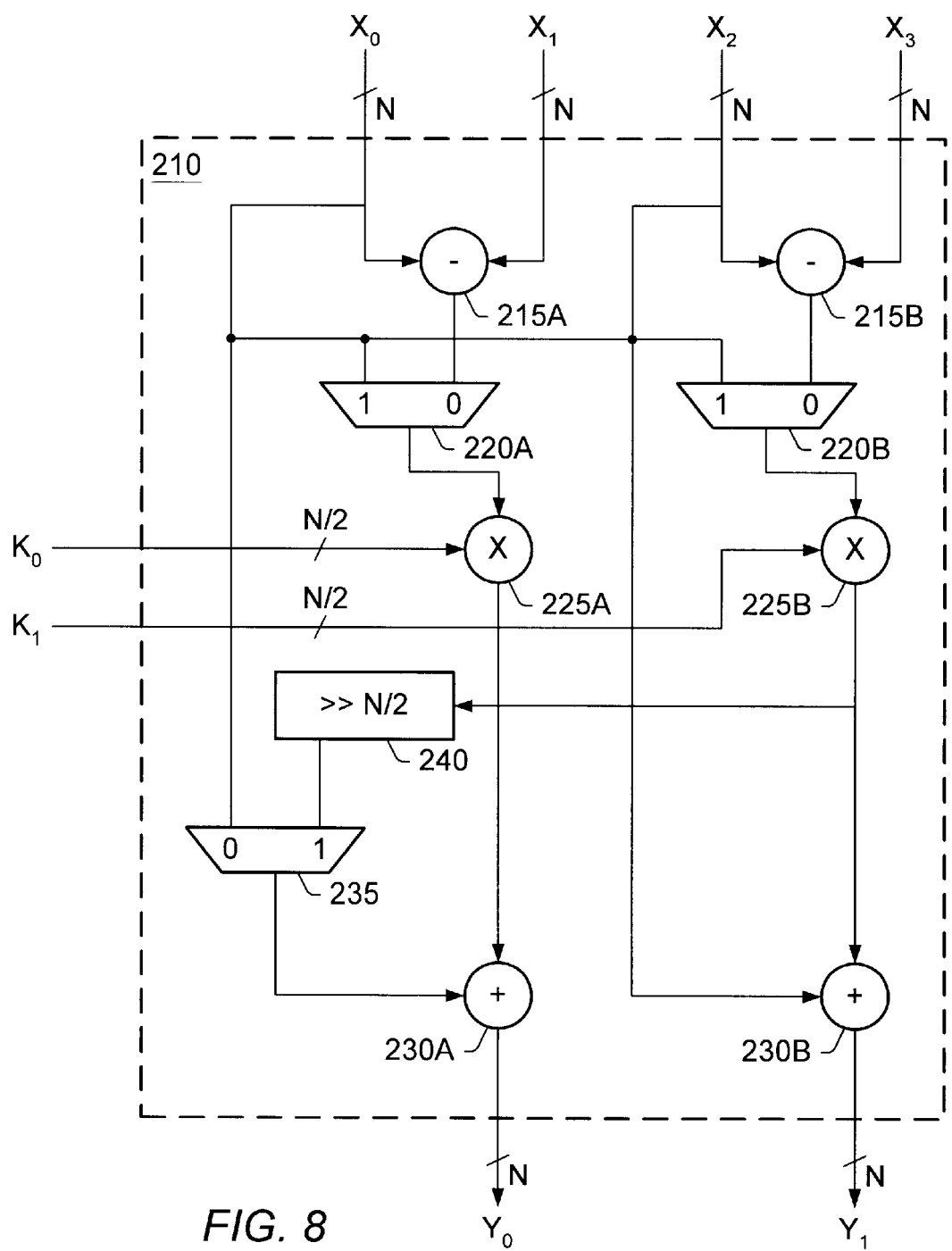
FIG. 8 illustrates one embodiment of multi-function computational unit configured to compute two linear interpolations with single precision coefficients or a single multiplication with a double precision coefficient.

Texture filter 170 may include a collection of computational blocks organized in a tree structure. FIG. 8 illustrates one embodiment of a computational block 210 including difference units 215A and 215B, multiplexors 220A and 220B, multipliers 225A and 225B, adders 230A and 230B, multiplexor 235 and shifter 240.

Computational block 210 may receive four N-bit inputs operands denoted $X_0$, $X_1$, $X_2$ and $X_3$, and two (N/2)-bit input operands denoted $K_0$ and $K_1$, where N is an positive even integer. Computation block 210 may generate two N-bit output values $Y_1$ and $Y_2$. Depending on the mode of operation, the operands $X_0$, $X_1$, $X_2$, $X_3$, $K_0$ and $K_1$ may have different interpretations.

In a linear interpolation mode, the values $X_0$, $X_1$, $X_2$, $X_3$ may be texel components (e.g., red, green, blue or α components of texels from a texture map), and the value $K_0$ and $K_1$ may be interpolation coefficients for a parallel computation of the form:

$Y_0 = (X_1 - X_0)*K_0 + X_0$, $Y_1 = (X_3 - X_2)*K_1 + X_2$.

The units 215A through 230A may implement the first equation, while the units 215B through 230B implement the second equation in parallel. For example, the values $X_0$ and $X_2$ may be the red and green components of a first texel, and the values $X_1$ and $X_3$ may be the red and green components of a second texel. The multiplexors 220A, 220B and 230A are configured (through the control lines which are not shown) to pass their "0" inputs.

In a sum-of-products mode (which may include a convolution mode and a bicubic filtering mode), computational unit 210 may perform a multiplication of an N-bit input operand Z with the N-bit coefficient C, i.e.

$Y_0 = Z*C$, $Y_1$ not used, where $K_0$ represents the high-order N/2 bits of coefficient C, and $K_1$ represents the low-order N/2 bits of coefficient C. The multiplication $Y_0 = Z*C$ may be implemented according to the relation $Y_0 = Z*K0 + ((Z*K1) >> N/2)$, where (V>>K) denotes the shifting of operand V to the right by K bits with zeros injected at the left. Processing logic external to the computational unit 210 may replicate the input operand Z at the inputs $X_0$ and $X_2$. Multiplexors 220A, 220B and 230A may be configured to pass their "1" inputs. The shifter 240 shifts the output of multiplier 225B to the right by (N/2) bits. It is noted that shifter 240 may be implemented by virtue of the connection of selected lines from the output bus of multiplier 225B to selected input lines at an input port (i.e. the "1" input) of multiplexor 235. The high order N/2 bits of the input port may be tied to zero.

Texture filter 170 may include a tree a computational units identical to or similar to computational unit 210. Two computational units in one stage feed a single computational unit in the next stage. Thus, the tree may have $2^L$ computational units in the first stage, and half as any computational units in each succeeding stage. Computation unit 210 may be well-suited for use in the first stage of the tree structure.

Figure 9:
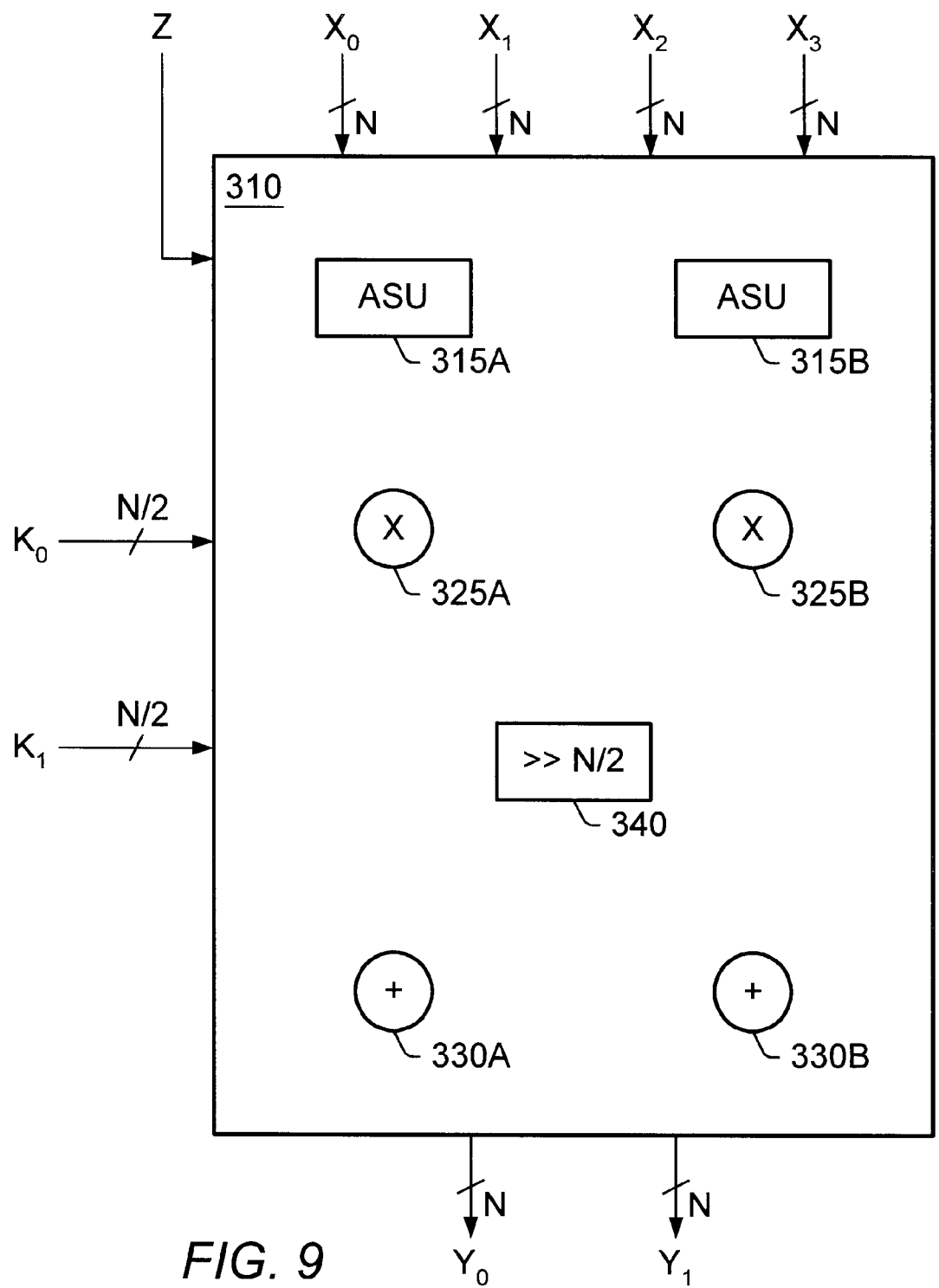
FIG. 9 illustrates an embodiment of a multi-function computational unit suitable for use in a second stage of a computational tree.

Computational units in stages after the first stage may be called upon to perform slighting different combinations of processing operations than the first stage computational units. Thus, in one set of embodiments, a computational unit 310 as shown in FIG. 9 may be configured for use in a second stage of the tree structure. Computational unit 310 includes adder/subtractor units 315A and 315B, multipliers 325A and 325B, adders 330A and 330B, shifter 340 (i.e. an N/2-bit right shift unit), and multiplexing logic (not shown). Each adder/subtractor unit includes sufficient logic to allow it to perform the function of either an adder or subtractor depending on a mode selection.

Figure 10A:
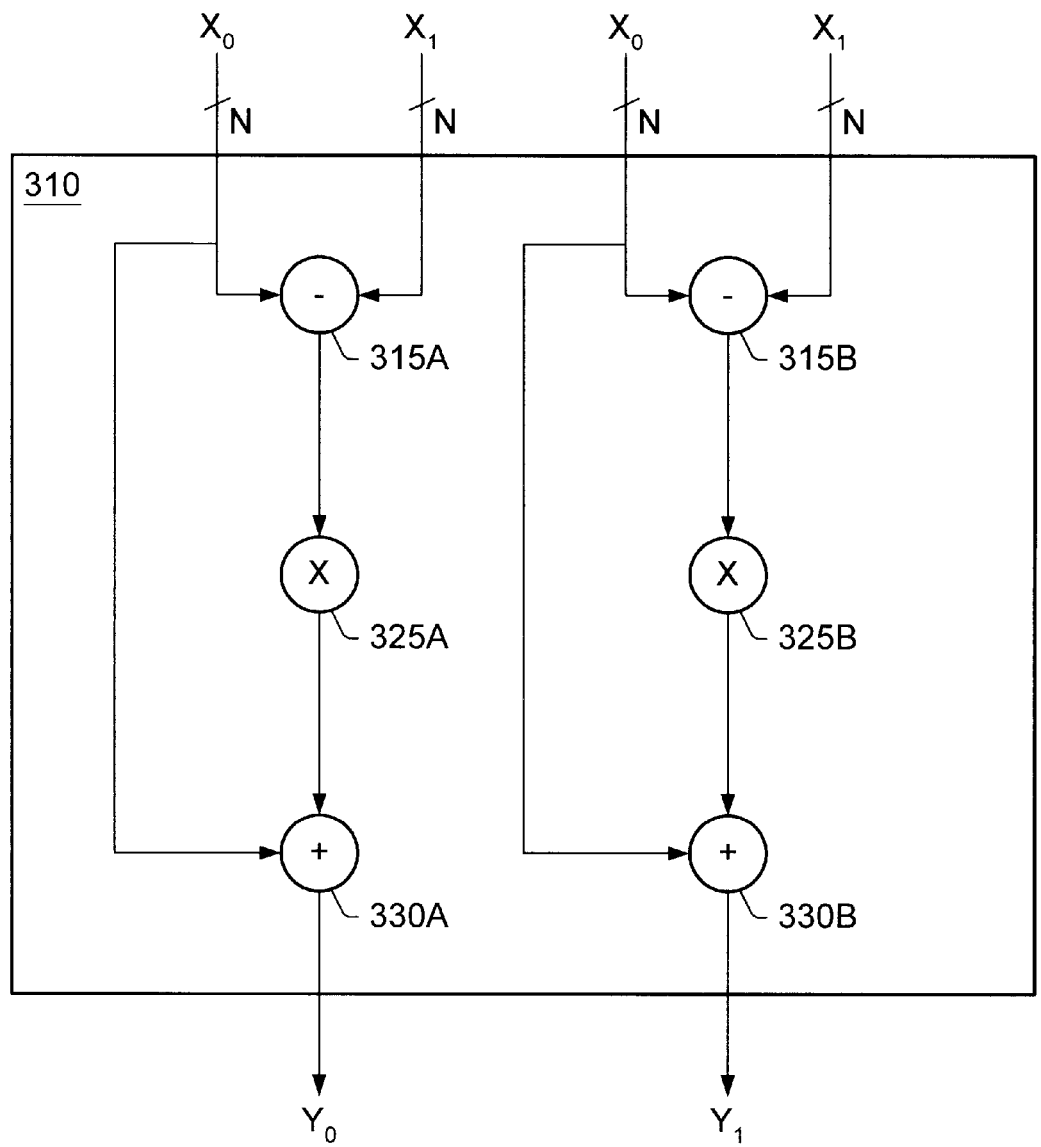
FIG. 10A illustrates a linear-interpolation mode of the computational unit of FIG. 9.

In a linear interpolation mode, computational unit 310 may implement the input-output relation:

$Y_0 = (X_1 - X_0)*K_0 + X_0$, $Y_1 = (X_3 - X_2)*K_1 + X_2$, where $K_0$ and $K_1$ are (N/2)-bit coefficients as shown in FIG. 10A.

Figure 10B:
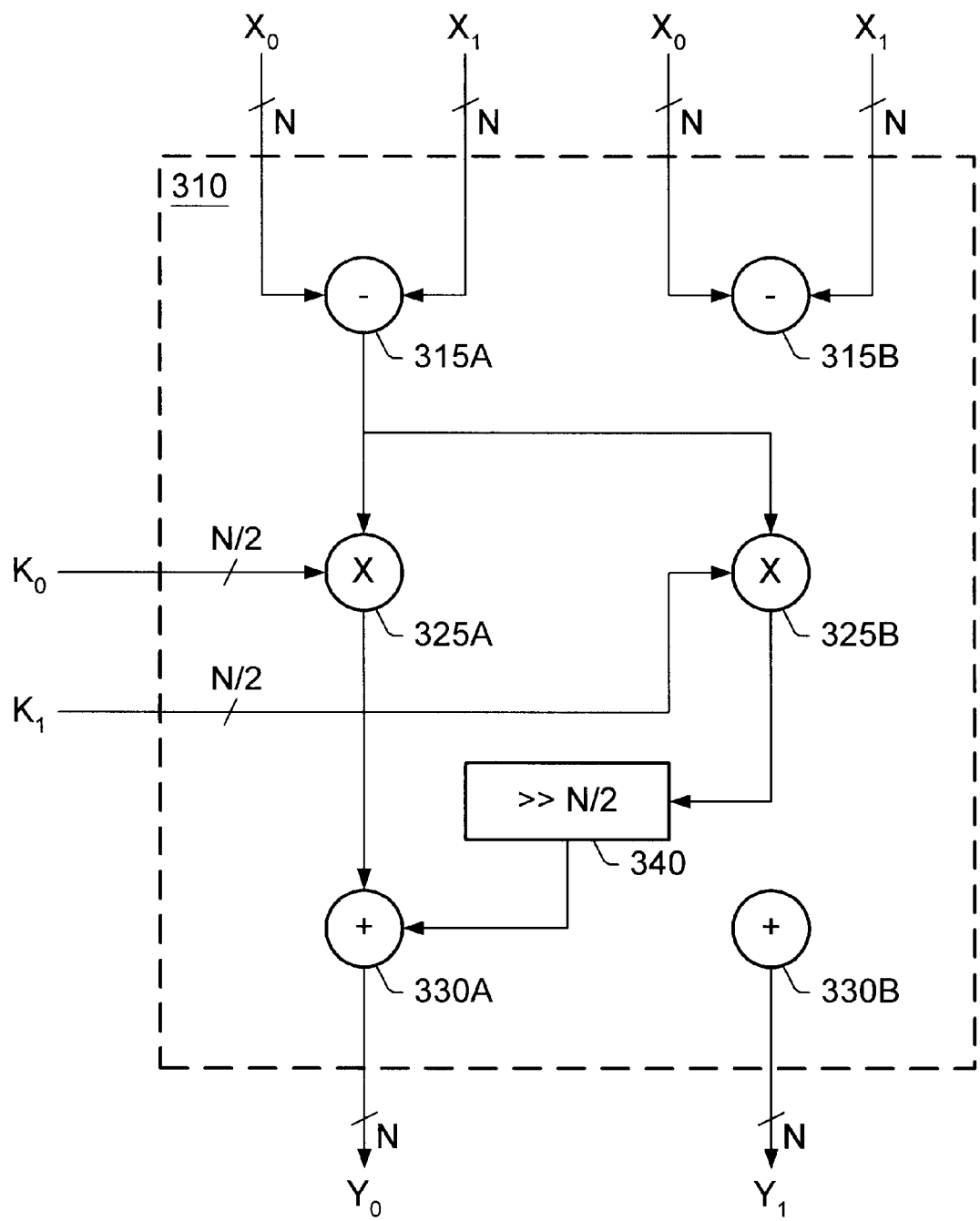
FIG. 10B illustrates a bicubic-filtering mode of the computational unit of FIG. 9.

In a bicubic filtering mode, computational unit 310 may implement the input-output relation:

$Y_0 = (X_0 + X_1)*K_0 + (((X_0 + X_1)*K_1) >> N/2)$ $Y_1$ not used, as shown in FIG. 10B. It is noted that shifter 340 may be implemented by the appropriate connection of selected lines from the output bus of multiplier 325B to selected input lines at an input port of a multiplexor.

Figure 10C:
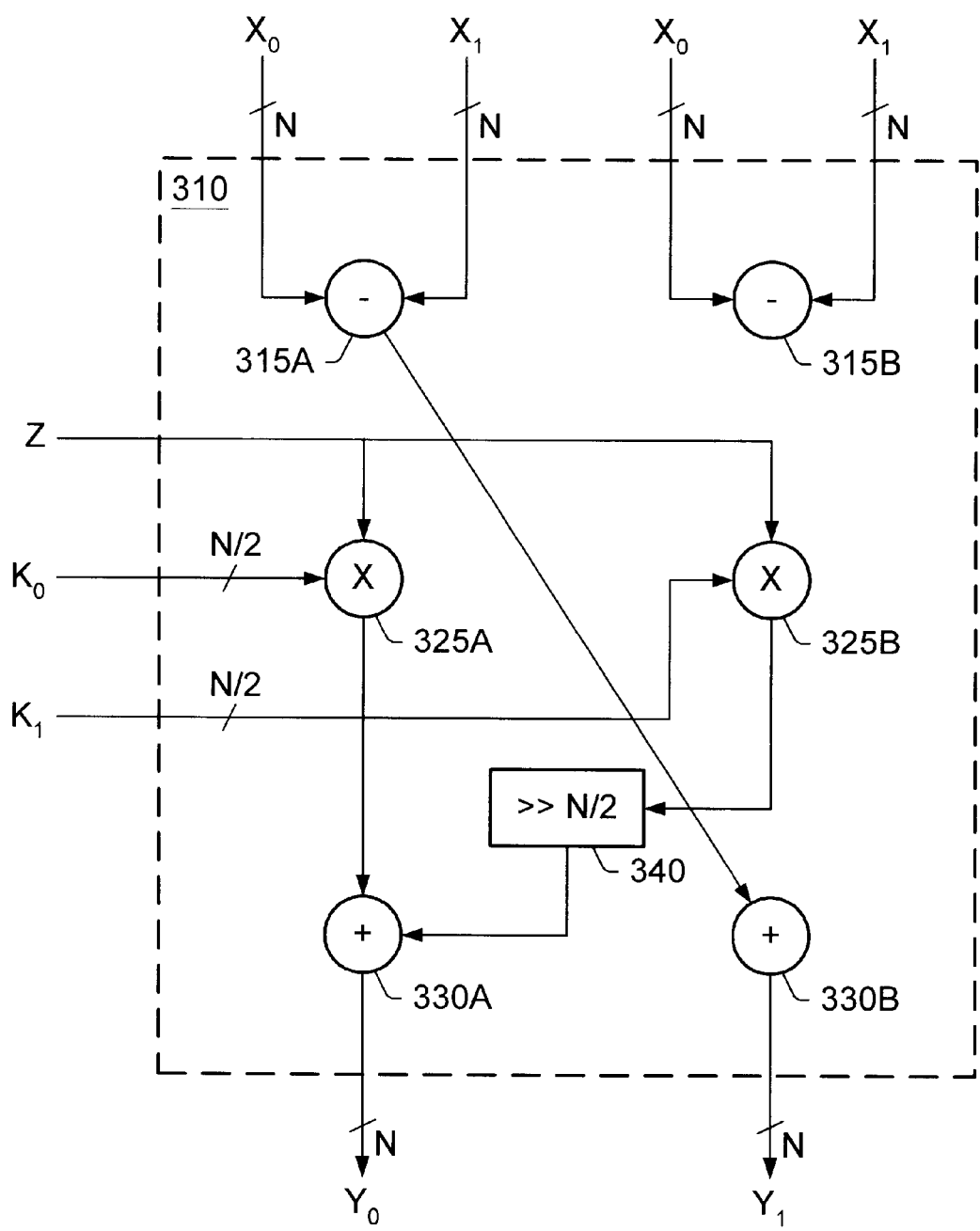
FIG. 10C illustrates a convolution-filtering mode of the computational unit of FIG. 9.

In a convolution filtering mode, computational unit 310 may implement the input-output relation:

$Y_0 = K_0*Z + ((K_1*Z) >> N/2)$ $Y_1 = X_0 + X_1$, where Z in an N-bit input operand (e.g. a pixel color value or α value) as shown in FIG. 10C. This mode allows the computational unit 310 to simultaneously process a pixel value Z and to accumulate results from a previous computational stage.

Figure 11:
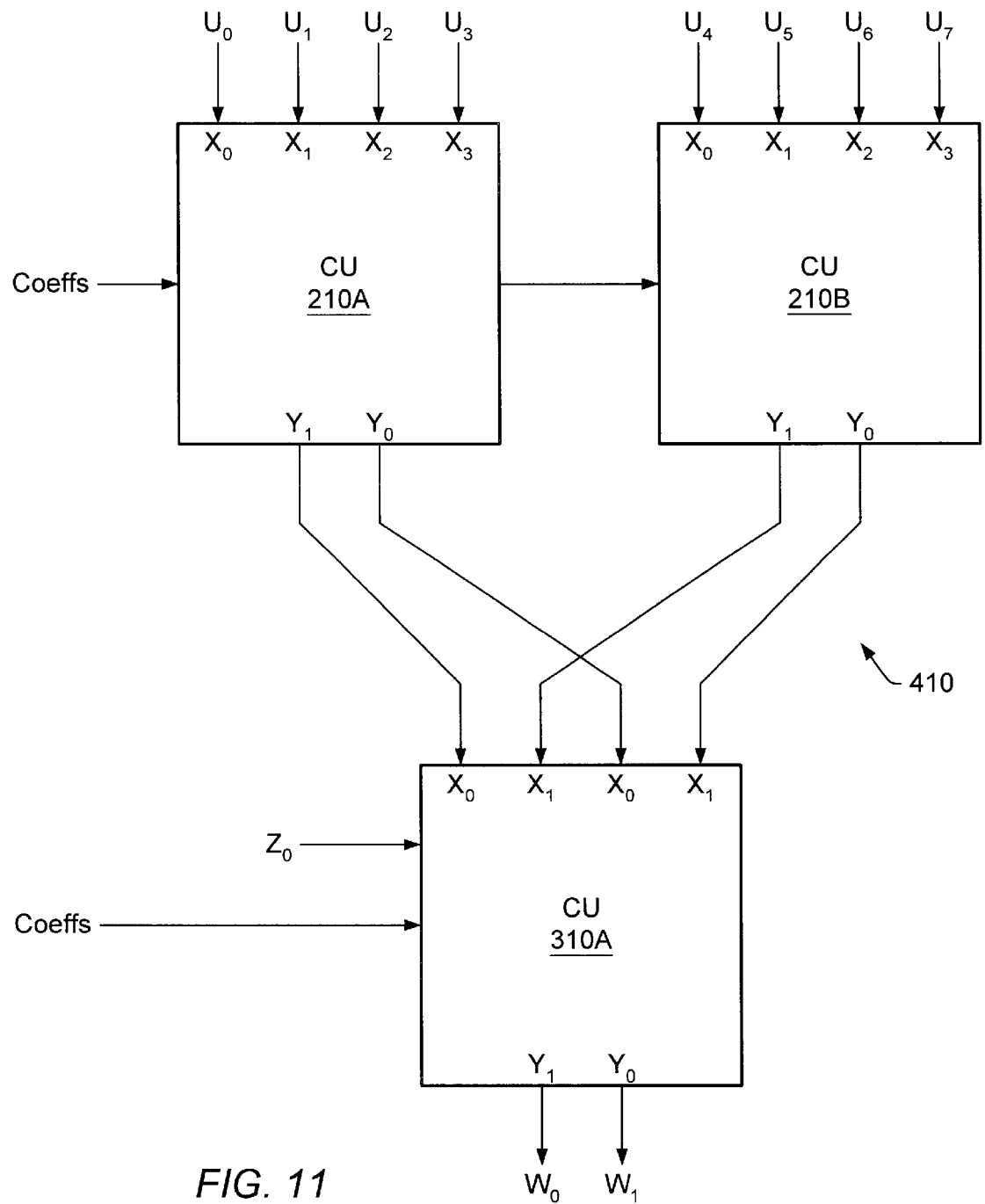
FIG. 11 illustrates a subtree of a possibly larger tree of computational units.

The tree structure of texture filter 170 may include a subtree 410 as illustrated in FIG. 11. Subtree 410 is composed of computational units 210A and 210B in a first stage feeding a computational unit 310A in a second stage. Computational units 210A and 210B may be identical to (or similar to) computational unit 210. Computational unit 310A may be identical to (or similar to) computational unit 310.

The subtree 410 may receive eight N-bit input operands $U_0$–$U_7$ and generate two N-bit output values $W_0$ and $W_1$. The input operands $U_0$–$U_3$ feed computational unit 210A.

The input operands $U_4$–$U_7$ feed computational unit 210B. The $Y_0$ and $Y_1$ outputs of computational unit 210A may feed the $X_0$ and $X_2$ inputs of computational unit 310A. The $Y_0$ and $Y_1$ outputs of the computational unit 210B may feed the $X_1$ and $X_3$ inputs of computational unit 310A. The outputs $Y_0$ and $Y_1$ of computational unit 310A may be the outputs $W_0$ and $W_1$ respectively of the subtree 410.

In the linear mode, subtree 410 may implement a bilinear filtering of two texel components (e.g. any two of red, green, blue and α) for four texels.

In the convolution mode, subtree 410 may implement a convolution on two input pixels $P_0$ and $P_1$. The first input pixel $P_0$ is provided to the inputs $U_0$ and $U_2$, while the second input pixel $P_1$ is supplied to the inputs $U_4$ and $U_6$.

In the bicubic filtering mode, subtree 410 may implement a bicubic filtering on three pixels $P_0$, $P_1$ and $P_2$. The first input pixel $P_0$ is provided to the inputs $U_0$ and $U_2$, while the second input pixel $P_1$ is supplied to the inputs $U_4$ and $U_6$. The third input pixel $P_2$ is provided to the $Z_0$ input of computational unit 310A.

Trees of arbitrary size (subject to fundamental constraints such as cost and availability of chip area) may be constructed from multi-use computational units as described above. Larger trees allow more input operands (e.g. texel components or pixel components) to be processed in parallel.

For example, a tree with three stages, i.e. four computational units in an input stage, two in a second stage, and one in a last stage may perform:
  (a) tri-linear filtering on two texel components (e.g. any two of red, green, blue and α) for eight texels;
  (b) bilinear filtering on four texel components for four texels,
  (c) 3D interpolation within a 3D rectangular solid (having eight vertices) in a 3D texture space;
  (d) bicubic filtering on four pixels; or
  (e) convolution on seven pixels (assuming all seven computational units are configured to receive one of the seven pixels).

A tree may include one or more accumulators which store partial summation results between computational cycles of the tree. Thus, a filtering operation that involves too many operands for once cycle may be accumulated in pieces through two or more computational cycles.

As used herein the term "convolution" refers to a sum of products of the form:

$$Q = \sum_{I,J} P_{I,J} C_{I,J},$$

where the values $P_{I,J}$ denote input pixels, the values $C_{I,J}$ denote the corresponding coefficients, and the indices I and J explore a neighborhood (e.g. a square or rectangular neighborhood) in an input image corresponding to the output pixel Q.

As used herein the term "bicubic filtering" refers to a sum of products of the form:

$$Q = \sum_{I,J} K_X(I) K_Y(J) P_{I,J}$$

where the values $P_{I,J}$ denote input pixels, the values $K_X(I)$ and $K_Y(J)$ are horizontal and vertical bicubic coefficients respectively. The indices I and J explore a neighborhood (e.g. a square or rectangular neighborhood) in an input image corresponding to the output pixel Q.

In one set of embodiments, the coefficients provided to the successive stages of the computational tree are organized as follows. In linear interpolation mode, computational units in the first stage may perform linear interpolation along a first texture direction, and computational units in the second stage may perform linear interpolation along a second texture direction. Together the first two stages thus implement a bilinear filtering. The third stage may implement linear interpolation along a third texture direction, and thus, the net effect of the three stages is a trilinear filtering. Other organizations of the coefficients with respect to the successive stages are possible and contemplated.

As described above, the texture filter 170 may be configured to perform arithmetic at different levels of precision, and to perform different functions based on a current mode of operation. Furthermore, the texture filter may simultaneously process K operands (e.g. pixel components or texel components), where K varies depending on the complexity of the filtering operation to be performed in the current mode. Simpler filtering operations may allow larger values of K.

In one set of embodiments, texture filter 170 may be configured (in a linear interpolation mode) to interpolate two pixels (i.e. the four pixel components R, G, B and α for two pixels) at N bits of precision per pixel component with an (N/2)-bit interpolation coefficient. Each output pixel component may be computed from two corresponding input pixel components according to the relation:

$$\text{out} = \text{in1} * F + \text{in2} * (1-F),$$

where F is the (N/2)-bit interpolation coefficient. The texture filter 170 may perform, e.g., 15 of these computations on each of R, G, B and A. A denotes a (i.e. transparency).

For more complex filtering, the texture filter 170 may be configured to perform double precision blending, where the blending fraction is N bits. This may be accomplished as described above by merging two basic computational subunits together and combining their results. In this way, it is possible to perform double-precision arithmetic on half as many operands as in the linear interpolation mode. This may be used for convolution and bicubic filtering where the filter coefficients are N bits, versus N/2 bits for normal teture mapping.

Texture filter 170 filter may include a set of computation units organized as a tree structure. At the functional level, the entire filter tree may be reorganized to process:
  two pixels at once for bilinear filtering,
  one pixel per cycle for trilinear filtering, or
  multiple cycles per pixel for convolution or bicubic filtering.
The filter tree may automatically act in a multi-cycle mode where partial results are accumulated for convolution and bicubic filtering.

In this way, a single filter tree may perform texture processing and image processing functions, at varying precision levels, and with its resources utilized optimally or near optimally.

It is noted that a multi-use filter based on a tree of multi-use computational units may be generally applicable to any of a variety of graphics systems or graphics chip, and is not limited to use in the system embodiments of FIG. 5.

While the above discussion has focussed on computational units built from the combination of two add/multiply/add subunits, it is noted that a computational unit may be generated by combining more than two add/multiply/add subunits. For example, three subunits may be combined so that the resulting computational unit may perform either one product with N-bit coefficient, or, three linear interpolations with (N/3)-bit coefficients.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A programmable filter comprising:
  a first layer of computational units configured to receive a set of input operands, wherein each computational unit of the first layer is configured to (a) linearly interpolate between a first pair of the input operands and between a second pair of input operands using respective coefficients $A_0$ and $A_1$ having N/2 bit precision in a first operational mode, wherein N is an even integer, (b) compute a product of a predetermined one of the input operands from the first pair and a coefficient C having N bit precision in both a second operational mode and a third operational mode;
  a second layer of computational units coupled to outputs of the first layer of computational units, wherein each computational unit of the second layer is configured to (c) linearly interpolate between a first pair of the outputs generated by the first layer and between a second pair of the outputs generated by the first layer using respective coefficients $B_0$ and $B_1$ having N/2 bit precision in the first operational mode, (d) compute a scaled sum of the first pair of outputs generated by the first layer using a coefficient D having N bit precision in the second operational mode, and (e) compute a sum of the first pair of outputs generated by the first layer and a product of an input Z and a coefficient E having N bit precision in the third operational mode.

2. The programmable filter of claim 1, wherein each computational unit of the first layer includes first and second subtraction units, first, second and third multiplexors, first and second multipliers, first and second adders, and first and second coefficient buses, wherein each of the coefficient buses is N/2 bits wide.

3. The programmable filter of claim 2,
  wherein, in the first operational mode, the first coefficient bus provides the coefficient $A_0$ and the second coefficient bus provides the coefficient $A_1$;
  wherein, in the second and third operational modes, the first coefficient bus provides the high order N/2 bits of the coefficient C, and the second coefficient bus provides the low order N/2 bits of the coefficient C.

4. The programmable filter of claim 2,
  wherein the first subtraction unit is configured to receive the first pair of the input operands, compute a first difference of the input operands of the first pair, and supply the first difference to a first input of the first multiplexor;
  wherein the second subtraction unit is configured to receive the second pair of the input operands, compute a second difference of the input operands of the second pair, and supply the second difference to a first input of the second multiplexor;
  wherein a second input of the first multiplexor and a second input of the second multiplexor are coupled to receive one of the input operands from the union of the first pair and second pair of input operands;
  wherein the first and second multiplexors are configured to pass their first inputs to the first and second multipliers respectively in the first operational mode and to pass their second inputs to the first and second multipliers respectively in the second and third operational modes.

5. The programmable filter of claim 4, wherein a first input of the third multiplexor is configured to receive a selected one of the input operands of the first pair, wherein a second input of the third multiplexor is configured to receive a shifted version of the output of the second multiplier, wherein the third multiplexor is configured to pass its first input to the first adder in the first operational mode and to pass its second input to the first adder in the second and third operational modes.

6. The programmable filter of claim 5, wherein the first adder is configured to compute a sum of the output of the third multiplexor and the output of the first multiplier, wherein the second adder is configured to compute a sum of a selected one of the input operands from the second pair and the output of the second multiplier, wherein the outputs of the first and second adder are provided to selected ones of the computational units in the second layer.

7. The programmable filter of claim 2,
  wherein the first multiplier is configured to receive the output of the first multiplexor, and multiply the first multiplexor output by a first N/2 bit value supplied through the first coefficient bus; and
  wherein the second multiplier is configured to receive the output of the second multiplexor, and multiply the second multiplexor output by a second N/2 bit value supplied through the second coefficient bus.

8. The programmable filter of claim 1, wherein the first layer contains L computational units, wherein L is an even integer, wherein the second layer contains L/2 computational units.

9. The programmable filter of claim 8, further comprising a third layer of computational units coupled to receive outputs of the second layer of computational units, wherein the third layer of computational units contains L/4 computational units;
  wherein each computational unit of the third layer is configured to (f) linearly interpolate between a first pair of the outputs generated by the second layer and between a second pair of the outputs generated by the second layer using respective coefficients $F_0$ and $F_1$ having N/2 bit precision in the first operational mode, (g) compute a scaled sum of the first pair of outputs generated by the second layer using a coefficient G having N bit precision in the second operational mode, and (h) compute a sum of the first pair of outputs generated by the second layer and a product of an input T and a coefficient H having N bit precision in the third operational mode.

10. The programmable filter of claim 8, wherein, in the first operational mode, the programmable filter is operable to perform a trilinear filtering, wherein each of the three layers performs interpolation along a corresponding one of three dimensions.

11. The programmable filter of claim 1, wherein the input operands represent color components of pixels in an image.

12. The programmable filter of claim 1, wherein the input operands represent color components of texels from a texture map.

13. The programmable filter of claim 1, wherein each of the computational units of the second layer includes first and second add-subtract units, first and second multipliers, first and second adders, multiplexing logic, and first and second coefficient buses, wherein each of the coefficient buses is N/2 bits wide.

14. The programmable filter of claim 13,
wherein, in the first operational mode, the first coefficient bus provides the coefficient $B_0$ and the second coefficient bus provides the coefficient $B_1$;
wherein, in the second operational mode, the first coefficient bus provides the high order N/2 bits of the coefficient D and the second coefficient bus provides the low order N/2 bits of the coefficient D; and
wherein, in the third operational mode, the first coefficient bus provides the high order N/2 bits of the coefficient E and the second coefficient bus provides the low order N/2 bits of the coefficient E.

15. The programmable filter of claim 13, wherein, in the first operational mode:
the first add-subtract unit is configured to receive the first pair of outputs generated by the first layer and compute a first difference of the outputs of the first pair,
the first multiplier is configured to multiply the first difference by the coefficient $B_0$ to determine a first product,
the first adder is configured to add the first product to a predetermined one of the outputs of the first pair;
the second add-subtract unit is configured to receive the second pair of outputs generated by the first layer and compute a second difference of the outputs of the second pair,
the second multiplier is configured to multiply the second difference by the coefficient B1 to determine a second product,
the second adder is configured to add the second product to a predetermined one of the outputs from the second pair.

16. The programmable filter of claim 13, wherein, in the second operational mode:
the first add-subtract unit is configured to receive the first pair of outputs generated by the first layer and compute a first sum of the outputs of the first pair;
the first multiplier is configured to multiply the first sum by the high order N/2 bits of the coefficient D to determine a first product;
the second multiplier is configured to multiply the first sum by the low order N/2 bits of the coefficient D to determine a second product;
the first adder is configured to add the first product to a shifted version of the second product.

17. The programmable filter of claim 13, wherein, in the third operational mode:
the first add-subtract unit is configured to receive the first pair of outputs generated by the first layer and compute a first sum of the outputs of the first pair;
the second adder is configured to add zero to the first sum to determine a second adder output;
the first multiplier is configured to multiply the input Z and the high order N/2 bits of the coefficient E to determine a first product;
the second multiplier is configured to multiply the input Z and the low order N/2 bits of the coefficient E to determine a second product;
the first adder is configured to add the first product and a shifted version of the second product to determine a first adder output.

18. A programmable filter comprising:
a first layer of computational units configured to receive a set of input operands, wherein each computational unit of the first layer is configured to (a) perform a first set of linear interpolations on pairs of the input operands using respective coefficients having N/2 bit precision in a first operational mode, wherein N is an even integer, (b) compute a product of one of the input operands and a coefficient having N bit precision in both a second operational mode and a third operational mode;
a second layer of computational units coupled to outputs of the first layer of computational units, wherein each computational unit of the second layer is configured to (c) perform a second set of linear interpolations on pairs of the outputs generated by the first layer using respective coefficients having N/2 bit precision in the first operational mode, (d) compute a scaled sum of a pair of the outputs generated by the first layer using a coefficient having N bit precision in the second operational mode, and (e) compute a sum of a pair of the outputs generated by the first layer and a product of an additional input Z and a coefficient having N bit precision in the third operational mode.

19. A programmable filter comprising a tree of computational units, wherein each computational unit is configured to receive multiple inputs and generate multiple outputs, wherein the tree receives a set of input operands and generates output operands, wherein, in a sum of products mode, the output operands of the tree comprise a sum of products of selected ones of the input operands by corresponding N-bit coefficients, wherein N is a positive integer, wherein, in a linear interpolation mode, each of the output operands of the tree comprise linear interpolations of at least two of the input operands, wherein coefficients of the linear interpolations have (N/J) bits of precision, wherein J is an integer greater than or equal to two and less than N;
wherein the sum of products mode includes a bicubic filtering mode;
wherein, in the bicubic filtering mode, a first layer of computational units in the tree scales selected ones of the input operands with corresponding N bit coefficients, and a second layer of computational units in the tree computes sums of selected pairs of the outputs from the first layer and scales the sums with corresponding N bit coefficients.

20. A programmable filter comprising a tree of computational units, wherein each computational unit is configured to receive multiple inputs and generate multiple outputs, wherein the tree receives a set of input operands and generates output operands, wherein, in a sum of products mode, the output operands of the tree comprise a sum of products of selected ones of the input operands by corresponding N-bit coefficients,
wherein N is a positive integer, wherein, in a linear interpolation mode, each of the output operands of the tree comprise linear interpolations of at least two of the input operands, wherein coefficients of the linear interpolations have (N/J) bits of precision, wherein J is an integer greater than or equal to two and less than N;
wherein the sum of products mode includes a convolution filtering mode;
wherein, in the convolution filtering mode, a first layer of computational units in the tree scales selected ones of the input operands with corresponding N bits coefficients, and a second layer of computational units in the tree scales additional inputs operands which are provided to the second layer with corresponding N bits coefficients and accumulates sums of the scaled operands generated in the first layer.

21. A programmable filter comprising a tree of computational units, wherein each computational unit is configured to receive multiple inputs and generate multiple outputs, wherein the tree receives a set of input operands and generates output operands, wherein, in a sum of products mode, the output operands of the tree comprise a sum of products of selected ones of the input operands by corresponding N-bit coefficients, wherein N is a positive integer, wherein, in a linear interpolation mode, each of the output operands of the tree comprise linear interpolations of at least two of the input operands, wherein coefficients of the linear interpolations have (N/J) bits of precision, wherein J is an integer greater than or equal to two and less than N;

wherein the computational units of the tree are arranged in successive layers, wherein a first layer contains L computational units and receives the inputs operands, wherein a second layer contains L/2 computational units and receives outputs from the first layer of computational units, wherein L is an even integer.

\* \* \* \* \*